United States Patent
Konishi et al.

(10) Patent No.: US 10,261,460 B2
(45) Date of Patent: Apr. 16, 2019

(54) PAPER FEED ROLLER AND IMAGE FORMING APPARATUS WITH THE PAPER FEED ROLLER

(71) Applicant: SUMITOMO RUBBER INDUSTRIES, LTD., Kobe-shi, Hyogo (JP)

(72) Inventors: Hirofumi Konishi, Kobe (JP); Akihiro Mine, Kobe (JP); Toshiyuki Hirai, Kobe (JP); Yoshihiro Yamada, Kobe (JP); Yudai Okuno, Kobe (JP); Yuichi Sato, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 248 days.

(21) Appl. No.: 15/277,651

(22) Filed: Sep. 27, 2016

(65) Prior Publication Data

US 2017/0097602 A1 Apr. 6, 2017

(30) Foreign Application Priority Data

Oct. 1, 2015 (JP) .................................. 2015-195893

(51) Int. Cl.
- *B65H 5/06* (2006.01)
- *B65H 27/00* (2006.01)
- *F16C 13/00* (2006.01)
- *G03G 15/00* (2006.01)

(52) U.S. Cl.
CPC ........... *G03G 15/6529* (2013.01); *B65H 5/06* (2013.01); *B65H 27/00* (2013.01); *F16C 13/00* (2013.01); *B65H 2404/1118* (2013.01); *B65H 2404/185* (2013.01); *B65H 2404/52131* (2013.01); *B65H 2404/531* (2013.01); *B65H 2404/5311* (2013.01); *F16C 2324/16* (2013.01); *G03G 2215/00679* (2013.01); *G03G 2215/2058* (2013.01)

(58) Field of Classification Search
CPC ...................... B65H 5/06; B65H 5/062; G03G 2215/00679; G03G 2215/2058; G03G 2215/2061; G03G 2215/2064; G03G 15/6529
See application file for complete search history.

(56) References Cited

U.S. PATENT DOCUMENTS

2014/0042691 A1* 2/2014 Mine ........................ B65H 5/06
271/264

FOREIGN PATENT DOCUMENTS

JP 2014-34428 A 2/2014

* cited by examiner

*Primary Examiner* — Christopher J Besler
(74) *Attorney, Agent, or Firm* — Birch, Stewart, Kolasch & Birch LLP

(57) ABSTRACT

A paper feed roller of the present invention comprises a roller body 2 integrally formed of elastic material in a cylindrical shape in which a plurality of protruding lines 6 are disposed on a peripheral surface 5 at even intervals, wherein the roller body 2 is formed so that crest portions 6a and trough portions 6b are continuously provided in a circumferential direction, an opening angle θ is equal to or more than 2° and is equal to or less than 8°, a radial height h of the protruding line is equal to or more than 0.051 mm and is equal to or less than 0.1 mm, and a curvature radius r1 at a shoulder is equal to or more than 0.55 mm.

4 Claims, 2 Drawing Sheets

PAPER FEED ROLLER AND IMAGE FORMING APPARATUS WITH THE PAPER FEED ROLLER

TECHNICAL FIELD

The present invention relates to a paper feed roller used for paper feeding in image forming apparatus such as an electrostatic copying machine and various kinds of printers and image forming apparatus with the paper feed roller.

BACKGROUND OF THE INVENTION

For a paper feed roller used for paper feeding in image forming apparatus such as an electrostatic copying machine and various kinds of printers, one with a roller body formed of elastic material such as crosslinked rubber in a cylindrical shape and whose peripheral surface is a contact surface to paper is generally used.

Paper powder generated from paper and dirt tend to be adhered to a peripheral surface of a paper feed roller, and an accumulation of paper powder and dirt on the peripheral surface of the roller after repetition of contacts with paper may decrease the friction coefficient of the peripheral surface of the roller to paper and cause defective paper carrying relatively early. Therefore, various kinds of surface forms has been studied and put in use (see, for example, JP2014-34428A).

JP2014-34428A, for example, discloses a paper feeding roller of elastic material in which a plurality of protruding lines are disposed at even intervals on its surface. The cross section of the protruding lines disclosed in JP2014-34428A, cut orthogonal to an axial direction of a roller body, is substantially shaped in a right angled triangle having the front side of a rotational direction of the roller body in a circumferential direction of the roller body as the hypotenuse and the back side as the adjacent side corresponding to a straight line extending through a central axis of the roller body. Also, these protruding lines are formed so that the crossing point of the hypotenuse and the adjacent side has a rounded shape. Also, JP2014-34428A discloses that an opening angle of the protruding lines, being an angle between adjacent protruding lines about the central axis of the roller body, is equal to or more than 2° and is equal to or less than 8° and a height of the protruding lines in a radial direction is equal to or more than 0.1 mm and is equal to or less than 0.5 mm. With the protruding lines having a height equal to or more than 0.1 mm contact pressure to paper is increased and defective paper carrying is inhibited.

SUMMARY OF THE INVENTION

In the paper feed roller of JP2014-34428A, contact pressure to paper is increased and a coefficient of friction between paper and the roller is well maintained by the height and shape of the protruding line. However, depending on a concave and convex shape formed by the protruding lines, narrow (e.g. equal to or longer than 5 mm) thread-like abrasion powder may be generated due to shaving of rubber of the roller at the early period of paper passing test, leading to defective image formation. On the other hand, if the height of the protruding lines is merely decreased, it leads to lowering of the contact pressure from the roller to paper, insufficient deformation of the rubber upon contacting with paper. Further, it leads to insufficient areas of trough portions formed between the protruding lines. Therefore, removal of paper powder and dirt becomes insufficient and that may lead to defective paper carrying.

The present invention has been made in the light of the problems mentioned above, and it is an object of the present invention to provide a paper feed roller and an image forming apparatus being capable of maintaining excellent paper passing performance preventing generation of narrow thread-like abrasion powder due to large shavings of rubber for a long time from the early period of use.

A paper feed roller of the present invention is a paper feed roller comprising a roller body integrally formed of elastic material in a cylindrical shape in which a plurality of protruding lines are disposed on a peripheral surface at even intervals, wherein the roller body is formed so that crest portions and trough portions continuously provided in a circumferential direction in a cross section orthogonal to an axial direction of the roller body, an opening angle being an angle between adjacent protruding lines about an central axis is equal to or more than 2° and is equal to or less than 8°, a radial height of the protruding line being a difference between heights of the crest portions and the trough portions is equal to or more than 0.051 mm and is equal to or less than 0.1 mm, and a curvature radius at a shoulder having a smallest curvature radius of the crest portion, is equal to or more than 0.55 mm.

Also, it is preferable that the curvature radius at the shoulder is equal to or less than 0.9 mm.

Also, it is preferable that the roller body is integrally formed with a crosslinked product of a rubber composition including ethylene-propylene rubber as a rubber content and peroxide as a crosslinking agent.

Also, an image forming apparatus comprises the above paper feed roller.

With a paper feed roller and an image forming apparatus of the present invention, excellent paper passing performance can be maintained preventing generation of narrow thread-like abrasion powder due to large shavings of rubber for a long time from the early period of use.

DETAILED DESCRIPTION

A paper feed roller of one aspect of the present invention will be described in the following with reference to figures. It should be noted that a paper feed roller of the present invention can be used as various kinds of paper feed rollers such as a paper feeding roller, a carrier roller, a platen roller, and a paper ejecting roller which are incorporated in paper feeding mechanisms of, for example, an electrostatic copying machine, a laser printer, a normal paper facsimile apparatus, and a multifunction machine of those, or an image forming apparatus such as an inkjet printer, as well as machines such as an automated teller machine (ATM).

Figure 1:
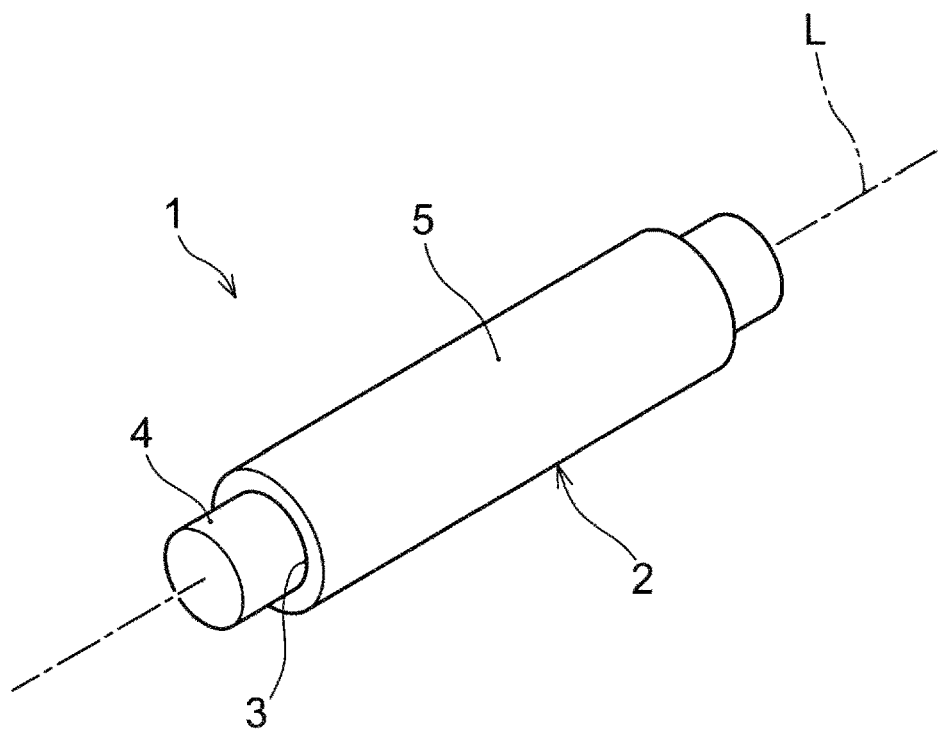
FIG. 1 is a perspective view of a paper feed roller of one embodiment of the present invention.

As shown in FIG. 1, a paper feed roller 1 of this embodiment comprises a cylindrical roller body 2 integrally formed of elastic material and a shaft 4 inserted through a through hole 3 in the center of the roller body 2. The shaft 4 is formed, for example, of metal, ceramic, hard resin, and etc. On a peripheral surface 5 of the roller body 2, a plurality of protruding lines are disposed in parallel with a central axis L of the roller body 2 at even intervals in a circumferential direction of the roller body 2 (see FIG. 2). The paper feed roller 1 is mounted to an image forming apparatus, which is not shown, and the shaft 4 is driven by a drive section such as a motor so that the paper feed roller is rotated. The roller body 2 feeds paper by contacting the paper fed to the roller body 2.

It is preferable that the roller body 2 is formed of elastic material such as rubber and integrally formed, for example, with a crosslinked product of a rubber composition which include ethylene-propylene rubber as a rubber content and peroxide as a crosslinking agent. A crosslinked product of a rubber composition has excellent low-temperature characteristics, and, for example, even under a low temperature and low humidity environment it ensures sufficient flexibility, allowing the roller body 2 to maintain its contact pressure to paper as well as a good coefficient of friction. Thus, the effectiveness of preventing defective paper carrying can be improved by maintaining a good coefficient of friction, especially when used under a low temperature and low humidity environment, for a long time from the early period of use.

It is preferable that a rubber content which becomes a base of the rubber composition includes ethylene-propylene rubber and IR (isoprene rubber) and also the mass ratio of IR to ethylene-propylene rubber is equal to or more than 90/10 and is equal to or less than 50/50. IR has a lower affinity than ethylene-propylene rubber to an organic component such as a sizing agent, which is included in paper powder and acts to adhere the paper powder to a surface of a roller body. Therefore, the adhesion of paper powder to the peripheral surface 5 of the roller body 2 can be inhibited more effectively by blending IR in the above ratio. Also, because IR has a low glass transition temperature, the low-temperature characteristics of the crosslinked products can be further improved by blending IR in the above ratio. Therefore, a good coefficient of friction is maintained and the effectiveness of preventing defective paper carrying can be further improved for a long time from the early period of use even when the roller is used with paper including especially high content of ash content or even when used under a low temperature and low humidity environment.

As examples of ethylene-propylene rubber, ethylene-propylene rubber (EPM) in a narrow sense which is a copolymer of ethylene and propylene and ethylene-propylene diene rubber (EPDM), which is a copolymer of ethylene, propylene, and diene, are included, and EPDM is especially preferable. As EPDM, any of various copolymers in which ethylene, propylene, and diene are copolymerized can be used. As examples of diene, ethylidene norbornane (ENB) and dicyclopentadiene (DCPD) are included. Also, as EPDM, either a so-called oil-extended EPDM, which is extended with extender oil, or non-oil-extended EPDM, which is not extended with extender oil, may be used. However, oil-extended EPDM is preferable for EPDM in consideration of improving processability and so on in preparing a rubber composition by blending an addition agent such as a crosslinking agent into two kinds of rubber contents and kneading them and in forming the rubber composition into a shape of paper feed roller.

Examples of ENB-based oil-extended EPDM, in which ENB is diene, include one or more of those such as ESPLENE (registered trademark) 670F (rubber content to extender oil=100:100 (mass ratio)) and 671F (rubber content to extender oil=100:70 (mass ratio)) manufactured by Sumitomo Chemical Co., Ltd. and Mitsui EPT3042E (rubber content to extender oil=100:120 (mass ratio)) manufactured by Mitsui Chemicals. Examples of DCPD-based oil-extended EPDM, in which DCPD is diene, include ESPLENE 400 (rubber content to extender oil=100:100 (mass ratio)) manufactured by Sumitomo Chemical Co., Ltd. and so on. Any one of the examples of EPDM mentioned above can be used alone or two or more of those can be used together.

When oil-extended EPDM is used as EPDM, the ratio of IR described above is the ratio to the rubber content (EPDM) included in the oil-extended EPDM. As IR, any of various kinds of IR such as ones whose isoprene is synthesized by a solution polymerization method using Ziegler catalyst, lithium catalyst, and so on can be used. Examples of IR include, but are not limited to, at least one of those such as NIPOL (registered trademark) IR2200 (specific gravity: 0.91, Mooney viscosity (central value): 82), IR2200L (specific gravity: 0.91, Mooney viscosity (central value): 70) manufactured by Nippon Zeon Co., Ltd.

A peroxide crosslinking agent, unlike conventional sulfur-crosslinking-based crosslinking agents, does not need to be used with a vulcanization accelerator or a vulcanization accelerator aid (such as stearic acid), which blooms on a peripheral surface 5 of a roller body 2 and so on and decrease the coefficient of friction and, in addition, the agent itself does not bloom. Therefore, it has an advantage that a good coefficient of friction is maintained for a long time from the early period of use and the effectiveness of preventing defective paper carrying can be further improved.

Examples of a peroxide crosslinking agent include one or more of those such as benzoyl peroxide, 1,1-Bis(tert-butylperoxy)-3,3,5-trimethylcyclohexane, 2,5-dimethyl-2,5-di(benzoylperoxy) hexane, di(tert-butylperoxy) diisopropylbenzene, 1,4-bis[(tert-butyl) peroxyisopropyl]benzene, di(tert-butylperoxy)benzoate, tert-butyl peroxybenzoate, dicumyl peroxide, tert-butyl cumyl peroxide, 2,5-dimethyl-2,5-di(tert-butylperoxy)hexane, di-tert-butyl peroxide, and 2,5-dimethyl-2,5-di(tert-butylperoxy)-3-hexyne.

The blending ratio of a peroxide crosslinking agent is preferably equal to or more than 0.8 parts by mass to 100 parts by mass of the total rubber content, especially equal to or more than 1.5 parts by mass, and is preferably equal to or less than 5 parts by mass, especially equal to or less than 3.5 parts by mass. When the blending ratio of a peroxide crosslinking agent is lower than the above-described range, abrasion resistance of a paper feed roller may be decreased. Also, when the ratio is higher than the above-described range, a paper feed roller may become too hard and a desirable coefficient of friction may be less likely to be realized.

Also, a reinforcing agent or filler such as carbon black or various kinds of additives such as oil and a plasticizer may be appropriately selected for blending to a rubber composition.

A roller body 2 can be formed, for example, by a press forming method or extrusion method using a rubber composition which is prepared as having each of the above-described components. In a press forming method, for example, a roller body 2 is formed by preparing a mold having a mold cavity corresponding to the three-dimensional shape of the roller body 2 having a plurality of protruding lines 6 with a predetermined shape, which will be described later, on a peripheral surface 5 of the roller body 2, filling a rubber composition into the mold cavity of the mold, and then heating under pressure so that the rubber composition is crosslinked.

Also, in an extrusion method, a roller body 2 can be formed by extruding a rubber composition into a cylindrical shape using an extrusion machine to which a die corresponding to a sectional shape of the roller body 2 having a plurality of protruding lines 6 with a predetermined shape on a peripheral surface 5 of the roller body 2 is connected and then crosslinking the rubber composition. The roller body 2 and a shaft 4 are integrated, for example, by forming an outside diameter of the shaft 4 which is larger than an inside diameter of a through hole 3 of the roller body 2 and press-fitting the shaft 4 into the through hole, by bonding the both with an adhesive, or by bonding them through vulcanization with a vulcanization adhesive when the roller body 2 is being crosslinked.

Also, at any point before and after integration of a roller body 2 and a shaft 4, the ends of the roller body 2 may be cut as necessary so that an axial length of the roller body 2, namely a width of a paper feed roller 1, becomes a predetermined value. Thus the paper feed roller 1 shown in FIG. 1 is manufactured. It should be noted that a roller body 2 may be formed with two-layer structure having an outer layer on the side of the peripheral surface and an inner surface on the side of the shaft 4. In that case, at least the outer layer needs to be formed of the above-described rubber composition.

Figure 2:
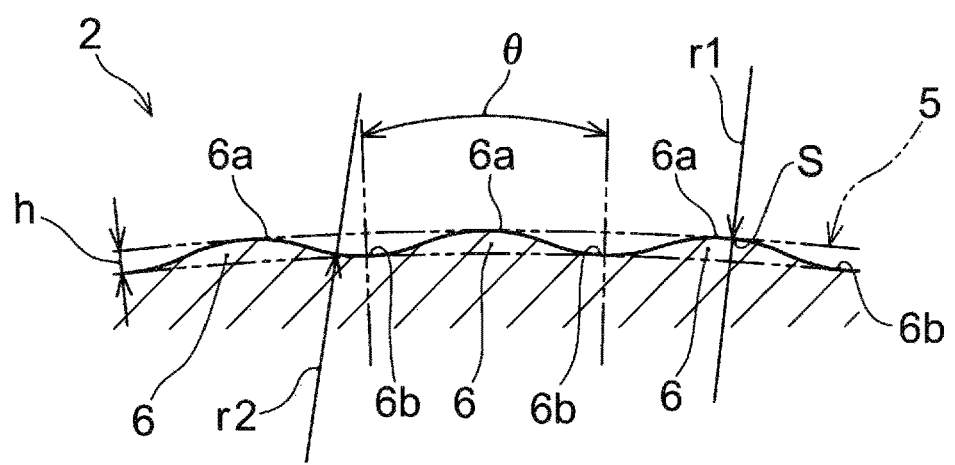
FIG. 2 is a sectional view of a roller body of the paper feed roller of FIG. 1 near a peripheral surface of the roller body being cut orthogonal to an axial direction of the roller body.

Next, structure of a peripheral surface of a roller body 2 will be explained. In this embodiment, as shown in FIG. 2, the roller body 2 is formed so that crest portions 6*a* and trough portions 6*b*, formed by a plurality of protruding lines 6, are continuously provided in a circumferential direction in a cross section orthogonal to the direction in which a central axis of the roller body 2 extends. Shapes of the crest portion 6*a* and the trough portion 6*b* are not limited to the illustrated shapes. However, in this embodiment, as shown in FIG. 2, the crest portion 6*a*, with its highest point as the center of symmetry, and the trough portion 6*b*, with its deepest point as the center of symmetry, are shaped symmetrically in the front and back in the rotation direction. The crest portion 6*a* and the trough portion 6*b* are respectively in a round shape formed as a wavy, curved surface in the circumferential direction of the roller body 2.

Crest portions 6*a* are pressed onto a surface of paper when a paper feed roller 1 feeds paper and send out the paper by the rotation of a roller body 2 with the crest portions 6*a* being pressed onto the surface of paper. In this embodiment, the crest portion 6*a* is a continuous, smooth, curved surface, which allows a large contact area with a surface of paper, so that stable feeding of paper is possible.

The trough portion 6*b* is, like the crest portion 6*a*, a continuous, smooth, curved surface and opens in a way that widens radially outward of the roller body 2 so that paper powder and dirt getting into trough portions 6*b* are removed smoothly.

A paper feed roller of this embodiment is formed so that it has an opening angle θ being an angle between adjacent protruding lines about the central axis L (see FIG. 2) is equal to or larger than 2° and is equal to or less than 8°, a radial height h of the protruding line 6 being the difference between heights of the crest portion 6*a* (the highest point of the crest 6*a*) and the trough portion 6*b* (the deepest point of the through portion 6*b*), is equal to or larger than 0.051 mm and is equal to or less than 0.1 mm, and a curvature radius r1 at a shoulder S having the smallest curvature radius of the crest portion 6*a*, (or a curvature radius of the crest portion 6*a* when the crest 6*a* has a constant curvature) is equal to or larger than 0.55 mm.

The opening angle θ between adjacent protruding lines 6 refers to an angle between two lines which extend from the central axis L toward the deepest points of two adjacent trough portions 6*b*. In this embodiment, the opening angle θ is equal to or more than 2° and is equal to or less than 8° so that the crest portion 6*a* has a large curvature radius while a large contact area of the protruding line to paper is secured. Also, it is more preferable that the opening angle θ is equal to or more than 3° and is equal to or less than 4° so that the effectiveness of removing paper powder and dirt from trough portions 6*b* can be further improved while a sufficient contact area to paper is secured. Therefore, the effectiveness of preventing defective paper carrying can be further improved.

In this embodiment, the radial height h of the protruding line 6 is equal to or larger than 0.051 mm and is equal to or less than 0.1 mm, preferably is equal to or larger than 0.07 mm and is equal to or less than 0.1 mm, so that generation of thread-like abrasion powder due to excessive pressure to the crest portion 6*a* of the protruding lines 6 is inhibited while they are applying sufficient contact pressure to paper. When the radial height h of the protruding line 6 is less than 0.051 mm, deformation of rubber upon contacting with paper is not sufficient and there are not sufficient areas secured for trough portions 6*b*, resulting in decreased effectiveness of removing paper powder and dirt, which may cause defective paper carrying. When the radial height h of the protruding line 6 is larger than 0.1 mm, excessive pressure is applied locally to the crest portion 6*a* and thread-like abrasion powder would be generated by shavings of rubber.

The shoulder S refers to a portion which has the smallest curvature radius of the crest portion 6*a*, and the curvature radius r1 at the shoulder S refers to a curvature radius at a portion which has the smallest curvature radius of the crest portion 6*a* formed as a curved surface. Therefore, when the crest portion 6*a* is formed as a curved surface which has a constant (unvarying) curvature in the circumferential direction, the curvature at the shoulder S is the curvature of the crest portion 6*a*. In this embodiment, the curvature radius r1 of the shoulder S is equal to or more than 0.55 mm so that the crest portion 6*a* is a smoothly curved surface and does not have a sharply angled portion where local concentration of pressure occurs upon pressure-contacting with paper, leading to inhibition of partial abrasion of crest portions 6*a*. It is preferable that the curvature radius r1 at a shoulder S is equal to or more than 0.7 mm and is equal to or less than 0.9 mm, and the curvature radius being in this range inhibits generation of thread like abrasion powder due to excessive pressure to the shoulder S of the protruding line 6 while allowing sufficient contact pressure to be applied to paper.

The trough portion 6*b* is formed as a curved surface which continues to the crest portion 6*a*. The curvature radius r2 of the trough portion 6*b* is not specifically limited; however, in this embodiment, it is preferable that the trough portion 6*b* has a curvature radius r2 equal to or more than 0.1 mm and equal to or less than 0.6 mm. When the curvature radius r2 of the trough portion 6*b* is equal to or more than 0.1 mm and is equal to or less than 0.6 mm, the crest portions 6*a* and trough portions 6b are formed as smooth, continuous, curved surfaces which allow smooth removal of paper powder and dirt getting into trough portions 6b. It is more preferable that the curvature radius r1 of the crest portion 6a is equal to or more than 0.55 mm and is equal to or less than 0.7 mm and the curvature radius r2 of the trough portion 6b is equal to or more than 0.4 mm and is equal to or less than 0.6 mm, and that makes the difference between the curvature radiuses r1 and r2 of the crest portion 6a and the trough portion 6b smaller and makes the curved surface formed by the crest portions 6a and the trough portions 6b smoother. Thus occurrence of cracks and so on due to excessive pressure to the trough portions 6b can be inhibited and stable performance of paper feeding can be exhibited for a long time from the early period of use.

The inventors have found out, by focusing on the three parameters of the opening angle θ, the radial height h of the protruding line, and the curvature radius of the shoulder S of the crest portion 6a and arranging those parameters in predetermined ranges, narrow thread-like abrasion powder (e.g. abrasion powder longer than 5 mm) due to large shavings of rubber and so on is not generated for a long time from the early period of use. Thus excellent paper passing performance can be maintained and defective image forming caused by narrow thread-like abrasion powder can be inhibited.

Especially, in this embodiment, the curvature radius r1 of the crest portion 6a, where pressure contact to paper is made, is equal to or more than 0.55 mm and the crest portion 6a is formed as a smoothly-continuous curved surface. Thus the crest portion 6a does not have a steeply curved portion where locally concentrated pressure is applied when pressure contact to paper is made. Then, without such a portion where locally concentrated pressure is applied to the crest portion 6a when the roller body 2 is pressure-contacted to paper, the protruding line has a height h equal to or more than 0.051 mm and equal to or less than 0.1 mm so that pressure applied to the crest portion 6a is limited within a predetermined range. Thus generation of narrow thread-like abrasion powder due to pressure locally applied to the crest portions 6a of the roller body 2 can be inhibited. Also, the opening angle between protruding lines and the height h of the protruding line form a smooth, curved surface which secures a contact area of the protruding line to paper and provides the protruding line with sufficient contact pressure to paper for obtaining carrying force required for paper carrying upon paper feeding. Therefore, this embodiment can maintain excellent paper passing performance and inhibit defective image formation due to narrow thread-like abrasion powder with the above-described three parameters.

EXAMPLES

The present invention will be explained based on examples; however, the present invention is not limited to the examples alone.

Example 1

As base material rubber, ENB-based oil-extended EPDM (the above-mentioned ESPLENE (registered trademark) 670F, rubber content to extender oil=100:100 (mass ratio) manufactured by Sumitomo Chemical Co., Ltd.) was used. A rubber composition was prepared by blending 3 parts by mass of dicumyl peroxide (PERCUMYL (registered trademark) D manufactured by NOF CORPORATION) as a peroxide crosslinking agent and 5 parts by mass of carbon black (HAF, available as SEAST 3 manufactured by TOKAI CARBON CO., LTD.) as a reinforcing agent/filler in 200 parts by mass of oil-extended EPDM and kneading them.

Next, a roller body 2 having a maximum diameter 23.6 mm, an inner diameter 20.13 mm, and a length 23.6 mm was formed by filling the prepared rubber composition into a mold cavity of a mold in which the mold cavity corresponds to a three-dimensional shape of a roller body 2 which has a plurality of protruding lines 6 with a predetermined shape on a peripheral surface 5 and crosslinking that under pressure at 160° for 20 minutes. Then a paper feed roller 1 was manufactured by press fitting a resin shaft 4 having a diameter 21.19 mm into a through hole of the roller body 2.

As shown in FIG. 2, protruding lines 6 form a smoothly curved shape where crest portions 6a and trough portions 6b continue. Respective dimensions of the roller body 2 and a number of protruding lines 6 (crest portions 6a) are as follows:

(a) Opening angle θ between protruding lines 6: 3.8°
(b) Distance between protruding lines 6 (the distance between the deepest points of trough portions 6b): 0.8 mm
(c) Height h of the protruding line 6: 0.076 mm
(d) Curvature radius r1 of the shoulder S (crest portion 6a): 0.55 mm
(e) Curvature radius r2 of the trough portion 6b: 0.54 mm
(f) Number of protruding lines 6: 95

Example 2

A paper feed roller 1 of Example 2 was manufactured in the manner similar to Example 1 except an alteration of a mold. The only difference from Example 1 made by the alteration of a mold is in a curvature radius r1 of a shoulder S and a curvature radius r2 of a trough portion 6b. Respective dimensions of a roller body 2 and a number of protruding lines 6 (crest portions 6a) are as follows:

(a) Opening angle θ between protruding lines 6: 3.8°
(b) Distance between protruding lines 6 (the distance between the deepest points of trough portions 6b): 0.8 mm
(c) Height h of the protruding line 6: 0.076 mm
(d) Curvature radius r1 of the shoulder S (crest portion 6a): 0.65 mm
(e) Curvature radius r2 of the trough portion 6b: 0.42 mm
(f) Number of protruding lines 6: 95

Example 3

A paper feed roller 1 of Example 3 was manufactured in the manner similar to Example 1 except an alteration of a mold. The only difference from Example 1 made by the alteration of a mold is in a curvature radius r1 of a shoulder S and a curvature radius r2 of a trough portion 6b. Respective dimensions of a roller body 2 and a number of protruding lines 6 (crest portions 6a) are as follows:

(a) Opening angle θ between protruding lines 6: 3.8°
(b) Distance between protruding lines 6 (the distance between the deepest points of trough portions 6b): 0.8 mm
(c) Height h of the protruding line 6: 0.076 mm
(d) Curvature radius r1 of the shoulder S (crest portion 6a): 0.75 mm
(e) Curvature radius r2 of the trough portion 6b: 0.3 mm
(f) Number of protruding lines 6: 95

Example 4

A paper feed roller 1 of Example 4 was manufactured in the manner similar to Example 1 except an alteration of a mold. The only difference from Example 1 made by the alteration of a mold is in a height h of a protruding line, a curvature radius r1 of a shoulder S, and a curvature radius r2 of a trough portion 6b. Respective dimensions of a roller body 2 and a number of protruding lines 6 (crest portions 6a) are as follows:
(a) Opening angle θ between protruding lines 6: 3.8°
(b) Distance between protruding lines 6 (the distance between the deepest points of trough portions 6b): 0.8 mm
(c) Height h of the protruding line 6: 0.083 mm
(d) Curvature radius r1 of the shoulder S (crest portion 6a): 0.81 mm
(e) Curvature radius r2 of the trough portion 6b: 0.15 mm
(f) Number of protruding lines 6: 95

Example 5

A paper feed roller 1 of Example 5 was manufactured in the manner similar to Example 1 except an alteration of a mold. The only difference from Example 1 made by the alteration of a mold is in a curvature radius r1 of a shoulder S and a curvature radius r2 of a trough portion 6b. Respective dimensions of a roller body 2 and a number of protruding lines 6 (crests 6a) are as follows:
(a) Opening angle θ between protruding lines 6: 3.8°
(b) Distance between protruding lines 6 (the distance between the deepest points of trough portions 6b): 0.8 mm
(c) Height h of the protruding line 6: 0.076 mm
(d) Curvature radius r1 of the shoulder S (crest portion 6a): 0.85 mm
(e) Curvature radius r2 of the trough portion 6b: 0.18 mm
(f) Number of protruding lines 6: 95

Comparative Example 1

Figure 3:
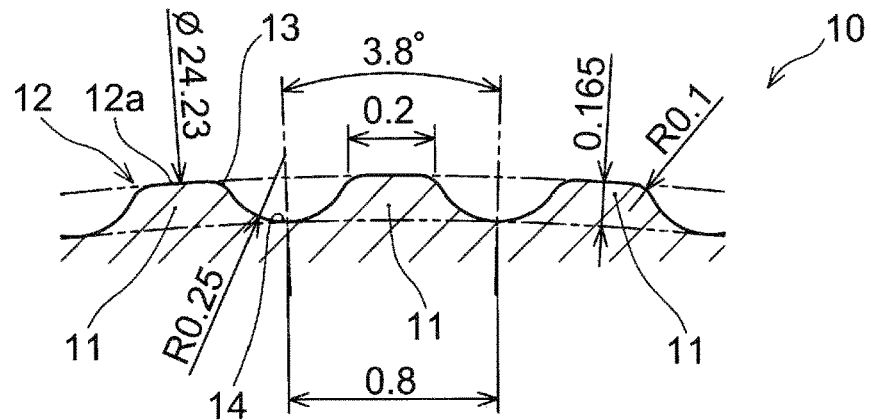
FIG. 3 is a sectional view of a roller body of a paper feed roller of Comparative Example 1 near a peripheral surface of the roller body being cut orthogonal to an axial direction of the roller body.

A paper feed roller of Comparative Example 1 was manufactured in the manner similar to Example 1 except an alteration of a mold. The difference from Example 1 made by the alteration of a mold is, as shown in FIG. 3, in that a flat area 12a is provided at the center of a crest portion 12 of a protruding line 11 of a roller body 10 and in a height h of a protruding line 11, a curvature radius r1 of a shoulder 13 and a curvature radius r2 of a trough portion 14. Respective dimensions of a roller body 10 and a number of protruding lines 11 (crest portions 12) are as follows:
(a) Opening angle θ between protruding lines 11: 3.8°
(b) Distance between protruding lines 11 (the distance between the deepest points of trough portions 14): 0.8 mm (the length of a flat area 12a: 0.2 mm)
(c) Height h of the protruding strip 11: 0.165 mm
(d) Curvature radius r1 of the shoulder 13: 0.1 mm
(e) Curvature radius r2 of the trough portion 14: 0.25 mm
(f) Number of protruding lines 11: 95

Comparative Example 2

Figure 4:
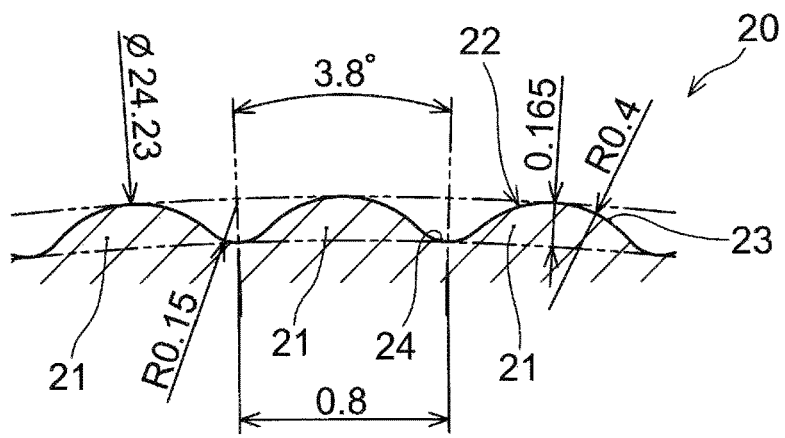
FIG. 4 is a sectional view of a roller body of a paper feed roller of Comparative Example 2 near a peripheral surface of the roller body being cut orthogonal to an axial direction of the roller body.

A paper feed roller of Comparative Example 2 was manufactured in the manner similar to Example 1 except an alteration of a mold. The only difference from Example 1 made by the alteration of a mold is, as shown in FIG. 4, in a height of a protruding line 21 (crest portion 22) of a roller body 20, a curvature radius r1 of a shoulder 23 and a curvature radius r2 of a trough portion 24. Respective dimensions of a roller body 20 and a number of protruding lines 21 (crest portions 22) are as follows:
(a) Opening angle θ between protruding lines 21: 3.8°
(b) Distance between protruding lines 21 (the distance between the deepest points of trough portions 24): 0.8 mm
(c) Height h of the protruding line 21: 0.165 mm
(d) Curvature radius r1 of the shoulder 23: 0.4 mm
(e) Curvature radius r2 of the trough portion 24: 0.15 mm
(f) Number of protruding lines 21: 95

Comparative Example 3

Figure 5:
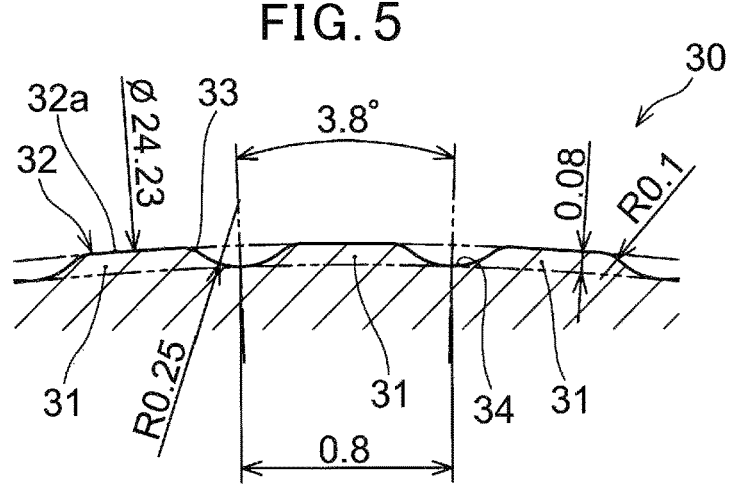
FIG. 5 is a sectional view of a roller body of a paper feed roller of Comparative Example 3 near a peripheral surface of the roller body being cut orthogonal to an axial direction of the roller body.

A paper feed roller of Comparative Example 3 was manufactured in the manner similar to Example 1 except an alteration of a mold. The difference from Example 1 made by the alteration of a mold is, as shown in FIG. 5, in that a flat area 32a is provided at the center of a crest portion 32 of a protruding line 31 of a roller body 30 and in a height h of a protruding line 31, a curvature radius r1 of a shoulder 33 and a curvature radius r2 of a trough portion 34. Respective dimensions of a roller body 30 and a number of protruding lines 31 (crest portions 32) are as follows:
(a) Opening angle θ between protruding lines 31: 3.8°
(b) Distance between protruding lines 31 (the distance between the deepest points of trough portions 34): 0.8 mm (length of the flat area 32a: 0.35 mm)
(c) Height h of the protruding line 31: 0.08 mm
(d) Curvature radius r1 of the shoulder 33: 0.1 mm
(e) Curvature radius r2 of the trough portion 34: 0.25 mm
(f) Number of protruding lines 31: 95

Paper Passing Test

Each of paper feed rollers of Example 1-5 and Comparative Example 1-3 was installed in a laser printer (LaserJet (registered trademark) M4555 MFP manufactured by Hewlett-Packard), passing of 5000 pieces of normal paper, which may generate thread-like abrasion powder, was conducted, and after the paper passing the paper feed roller was removed and checked for thread-like abrasion powder. Those with thread-like abrasion powder equal to or longer than 5 mm are marked with x and those with thread-like abrasion powder shorter than 5 mm are marked with o. The results were shown in Table 1.

TABLE 1

| | Height of crest portion | Curvature radius at shoulder (mm) | Curvature radius of trough portion (mm) | Result of paper passing |
| --- | --- | --- | --- | --- |
| Example 1 | 0.076 | 0.55 | 0.54 | o |
| Example 2 | 0.076 | 0.65 | 0.42 | o |
| Example 3 | 0.076 | 0.75 | 0.30 | o |
| Example 4 | 0.083 | 0.81 | 0.15 | o |
| Example 5 | 0.076 | 0.85 | 0.18 | o |
| Comparative Example 1 | 0.165 | 0.10 | 0.25 | x |
| Comparative Example 2 | 0.165 | 0.40 | 0.15 | x |
| Comparative Example 3 | 0.080 | 0.10 | 0.25 | x |

As shown in Table 1, narrow thread-like abrasion powder over 5 mm was generated in cases with the radial height of the protruding line is over 0.1 mm and in cases with the curvature radius at the shoulder is less than 0.55 mm. On the other hand, Table 1 has shown that narrow thread-like abrasion powder which is equal to or longer than 5 mm is not generated in cases in which the radial height of the protrusion line is equal to or more than 0.051 mm and is equal to or less than 0.1 mm and also the curvature radius at the shoulder, which has the smallest curvature radius of the crest portion, is equal to or more than 0.55 mm.

It has been found that with the three parameters of the opening angle of the protruding line, the height of the protruding line, and the curvature radius at the shoulder being in the range according to the present invention as stated above, an excellent paper passing performance can be maintained and defective image formation due to narrow thread-like abrasion powder can be inhibited.

REFERENCE SIGNS 1 paper feed roller
2 roller body
3 through hole
4 shaft
5 peripheral surface of roller body
6 protruding line
6a crest portion
6b trough portion
h radial height of protruding line
L central axis of roller body
r1 curvature radius at shoulder
r2 curvature radius of trough portion
S shoulder
θ opening angle of protruding line

What is claimed is:

1. A paper feed roller comprising a roller body integrally formed of elastic material in a cylindrical shape in which a plurality of protruding lines are disposed on a peripheral surface at even intervals;
    wherein the roller body is formed so that crest portions and trough portions are continuously provided in a circumferential direction in a cross section orthogonal to an axial direction of the roller body,
    an opening angle between adjacent protruding lines about a central axis of the roller body is equal to or more than 2° and is equal to or less than 8°,
    a radial height of the protruding lines, being a difference between heights of the crest portions and the trough portions, is equal to or more than 0.051 mm and is equal to or less than 0.1 mm, and
    a curvature radius at a shoulder of the crest portions, having a smallest curvature radius of the crest portions, is equal to or more than 0.55 mm.

2. The paper feed roller of claim 1, wherein the curvature radius at the shoulder is also equal to or less than 0.9 mm.

3. The paper feed roller of claim 1, wherein the roller body is integrally formed with a crosslinked product of a rubber composition including ethylene-propylene rubber as a rubber content and peroxide as a crosslinking agent.

4. An image forming apparatus comprising the paper feed roller of claim 1.

* * * * *